（12）United States Patent
Dong et al.

(10) Patent No.: US 8,737,772 B2
(45) Date of Patent: May 27, 2014

(54) REDUCING OPTICAL LOSS IN AN OPTICAL MODULATOR USING DEPLETION REGION

(75) Inventors: Po Dong, Arcadia, CA (US); Dazeng Feng, Arcadia, CA (US); Shirong Liao, Mira Loma, CA (US); Mehdi Asghari, San Marino, CA (US)

(73) Assignee: Kotura, Inc., Monterey Park, CA (US)

( * ) Notice: Subject to any disclaimer, the term of this patent is extended or adjusted under 35 U.S.C. 154(b) by 807 days.

(21) Appl. No.: 12/660,149

(22) Filed: Feb. 19, 2010

(65) Prior Publication Data

US 2011/0206313 A1    Aug. 25, 2011

(51) Int. Cl.
  *G02F 1/035*    (2006.01)
(52) U.S. Cl.
  USPC .............................................................. 385/2
(58) Field of Classification Search
  USPC .............................................................. 385/2
  See application file for complete search history.

(56) References Cited

U.S. PATENT DOCUMENTS

| | | | |
|---|---|---|---|
| 6,215,577 B1 | 4/2001 | Koehl et al. | |
| 6,298,177 B1 | 10/2001 | House | |
| 6,421,476 B1 | 7/2002 | Shekel et al. | |
| 7,116,853 B2 * | 10/2006 | Gunn et al. | 385/14 |
| 7,394,948 B1 | 7/2008 | Zheng et al. | |
| 7,394,949 B1 | 7/2008 | Feng et al. | |
| 7,542,630 B2 | 6/2009 | Zheng et al. | |
| 2002/0118903 A1 | 8/2002 | Cottrell et al. | |
| 2009/0310901 A1 | 12/2009 | Dong | |

OTHER PUBLICATIONS

Zheng et al., *Design of a 10 GHz Silicon Modualtor Based on a 0.25 μm CMOS Process—A Silicon Photonics Approach*, 2006, vol. 6125, Proc. of SPIE, pp. 1-10.
Liu et al., *High-Speed Optical Modulation Based Carrier Depletion in a Silicon Waveguide*, Jan. 22, 2007, vol. 15, No. 2, Optics Express, pp. 660-668.

* cited by examiner

*Primary Examiner* — Ryan Lepisto
*Assistant Examiner* — Erin Chiem
(74) *Attorney, Agent, or Firm* — Gavrilovich, Dodd & Lindsey, LLP

(57) ABSTRACT

An optical device includes a light-transmitting medium positioned on a base. The light-transmitting medium includes a slab region and a ridge extending upward from the slab region. The ridge defines a portion of an optical waveguide on the device. A modulator is also positioned on the base. The modulator includes a first doped region of the light-transmitting medium and a second doped region of the light-transmitting medium. The first doped region and the second doped region are configured such that a depletion region forms in the waveguide when an electrical bias is not applied to the modulator. At least a portion of the first doped region is positioned in the ridge and at least a portion of the second doped region is positioned in the slab region. The light-transmitting medium includes a first electrical pathway extending from a first location to the first doped region. The first location is on top of the light-transmitting medium and is spaced apart from the ridge.

20 Claims, 10 Drawing Sheets

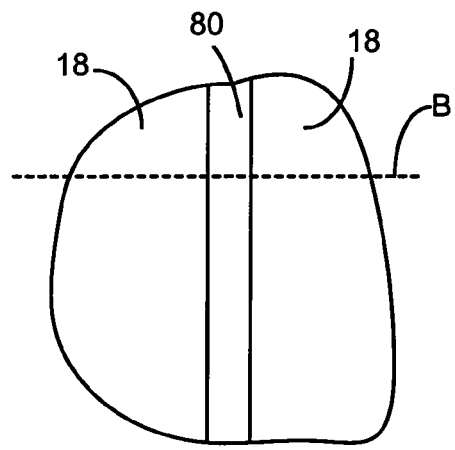
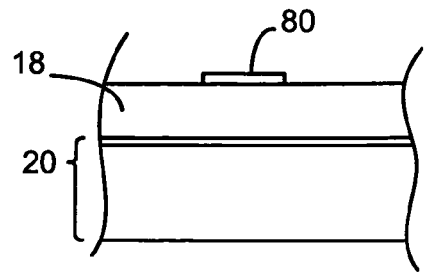
Figure 9A
Figure 9B
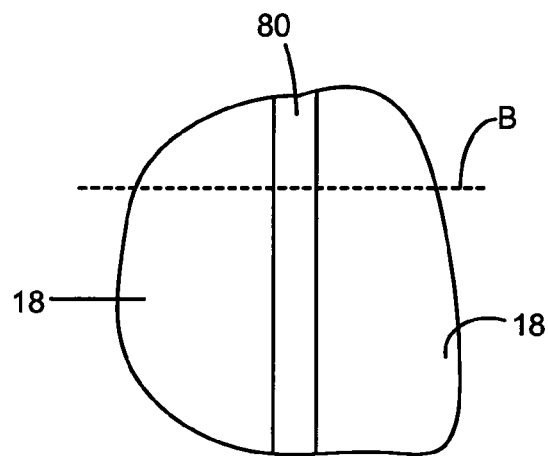
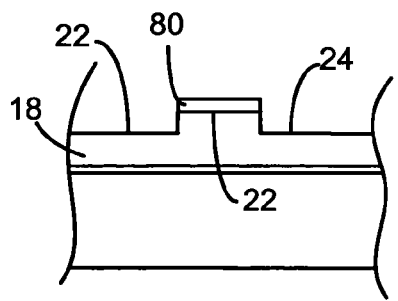
Figure 10A
Figure 10B

REDUCING OPTICAL LOSS IN AN OPTICAL MODULATOR USING DEPLETION REGION

FIELD

The present invention relates to optical devices and more particularly to devices having optical modulators.

BACKGROUND

Optical modulators are commonly used in communications applications. A variety of these modulators use a depletion region to achieve high-speed modulation. For instance, these phase modulators often include a waveguide that has an n-type doped region and a p-type doped region positioned such that a depletion region is formed in the waveguide when a bias is not applied to the modulator. The modulator is tuned by applying a reverse bias to the modulator. The reverse bias changes the size of the depletion region. The depletion region has a different index of refraction than the surrounding light-transmitting region. As a result, changing the size of the depletion region changes the speed at which the light signal travels through the waveguide. Accordingly, the speed of the light signal through the waveguide can be tuned by tuning the bias level applied to the modulator. Tuning the speed at which the light signal travels through the waveguide allows the modulator to be employed as a phase modulator.

Many of these modulators often have an undesirably high level of optical loss as a result of the structures that are used to apply the reverse bias to the waveguide. As a result, there is a need for an optical modulator having improved loss characteristics.

SUMMARY

An optical device includes a light-transmitting medium positioned on a base. The light-transmitting medium includes a slab region and a ridge extending upward from the slab region. The ridge defines a portion of an optical waveguide on the device. A modulator is also positioned on the base. The modulator includes a first doped region of the light-transmitting medium and a second doped region of the light-transmitting medium. The first doped region and the second doped region are configured such that a depletion region forms in the waveguide when an electrical bias is not applied to the modulator. At least a portion of the first doped region is positioned in the ridge and at least a portion of the second doped region is positioned in the slab region. The light-transmitting medium includes a first electrical pathway extending from a first location to the first doped region. The first location is on top of the light-transmitting medium and is spaced apart from the ridge.

BRIEF DESCRIPTION OF THE FIGURES

FIG. 2A illustrates the lower vertical portion of the interface located under a ridge in the light-transmitting medium where the ridge defines a portion of the waveguide.

FIG. 2B illustrates the lower vertical portion of the interface moved out from under the ridge in the light-transmitting medium where the ridge defines a portion of the waveguide.

FIG. 3A illustrates the modulator of FIG. 1F with the upper vertical portion of the interface moved out from under the ridge.

FIG. 3B illustrates the modulator of FIG. 2A with the upper vertical portion of the interface moved out from under the ridge FIG. 3C illustrates the modulator of FIG. 2B with the upper vertical portion of the interface moved out from under the ridge.

FIG. 4A illustrates the modulator of FIG. 1F with the upper vertical portion of the interface in and under the ridge.

FIG. 4B illustrates the modulator of FIG. 2A with the upper vertical portion of the interface in and under the ridge.

FIG. 4C illustrates the modulator of FIG. 2B with the upper vertical portion of the interface in and under the ridge.

FIG. 9A through FIG. 14 illustrate methods for forming optical devices having a modulator constructed according to FIG. 1A through FIG. 5B.

DESCRIPTION

A device that includes the modulator includes a waveguide positioned on a base. The waveguide is at partially defined in a light-transmitting medium that includes a ridge extending from a slab region. The ridge includes a first doped region and the slab region includes a second doped region. When the first doped region includes an n-type dopant, the second doped region includes a p-type dopant and when the first doped region includes a p-type dopant, the second doped region includes an n-type dopant. The first doped region and the second doped region are positioned such that a depletion region forms in the waveguide when a bias is not applied to the modulator.

The first doped region is shaped such that there is an electrical pathway through the light-transmitting medium from the first doped region to a contact position that is on the slab region and spaced apart from the ridge. Additionally, the electrical pathway extends through the slab region of the light-transmitting medium. As a result, electrical energy can be applied to the first doped region by applying electrical energy to the contact position. Since the electrical pathway is through the light-transmitting medium and is from a location that is on the slab region, there is no need to apply electrical energy directly to the ridge of the waveguide. As a result, the modulator is not associated with the optical loss that occurs when a metal contact or highly doped material is used to apply electrical energy directly to the ridge.

Figure 1A:
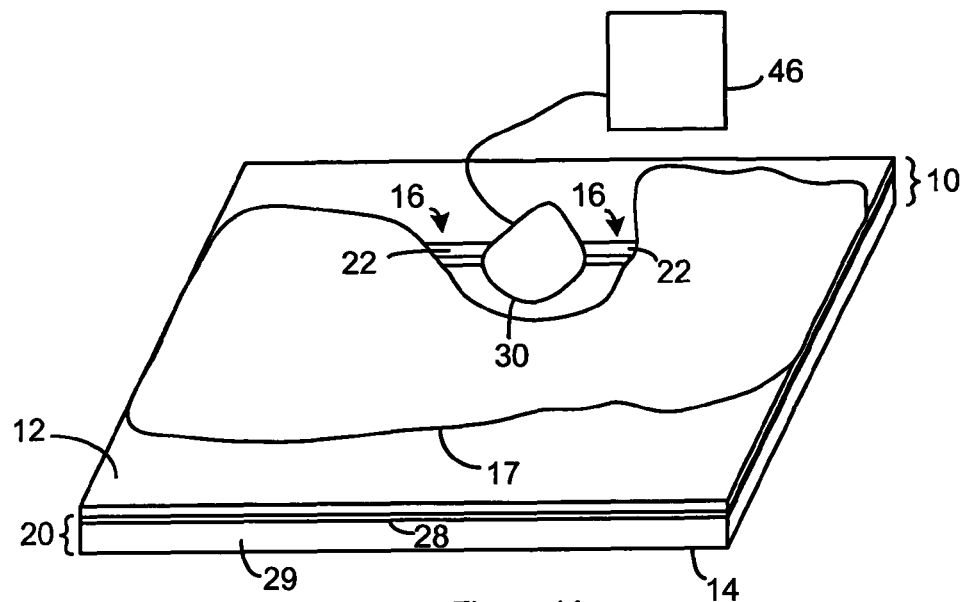
FIG. 1A through FIG. 1F illustrate an optical device having an optical modulator. The modulator includes a waveguide defined in a light-transmitting medium. The light-transmitting medium includes a doped region having an n-type dopant and another doped region having a p-type dopant. The doped regions are interfaced such that a depletion region forms in the light-transmitting medium when an electrical bias is not applied to the modulator. The interface includes a lower vertical portion and an upper vertical portion.
Figure 1B:
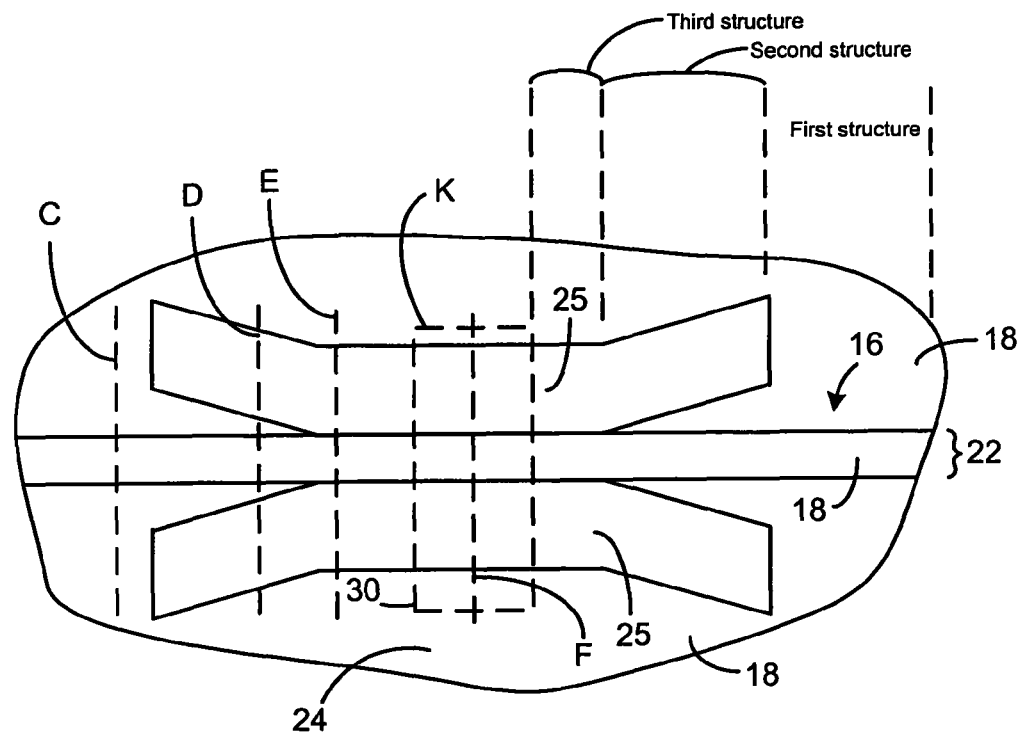
Figure 1C:
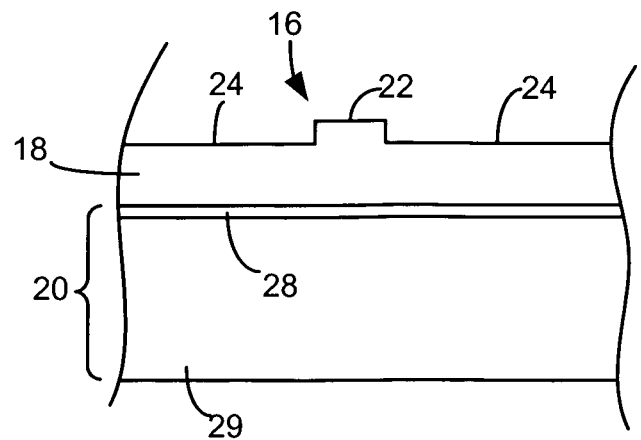
Figure 1D:
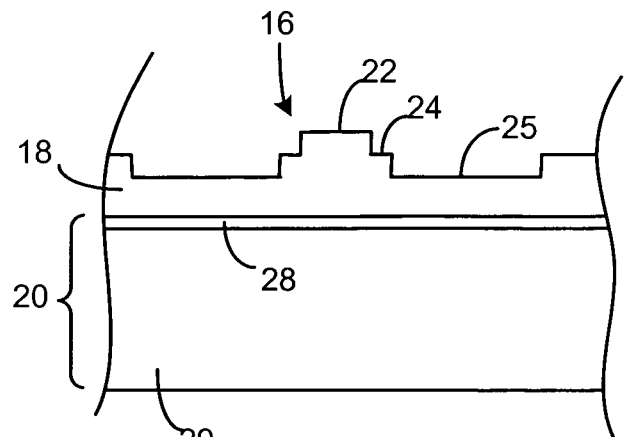
Figure 1E:
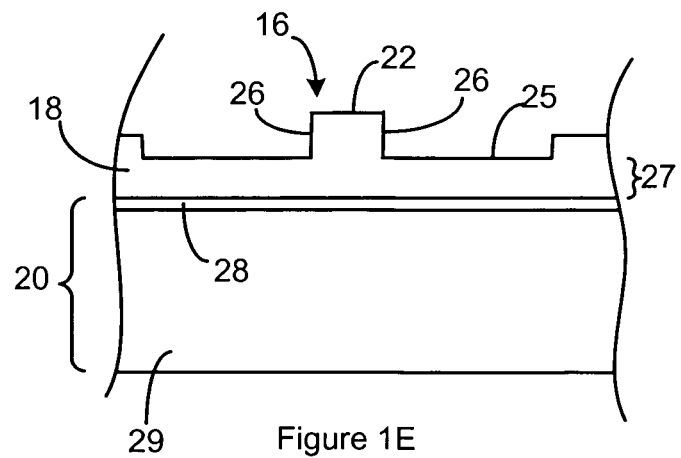
Figure 1F:
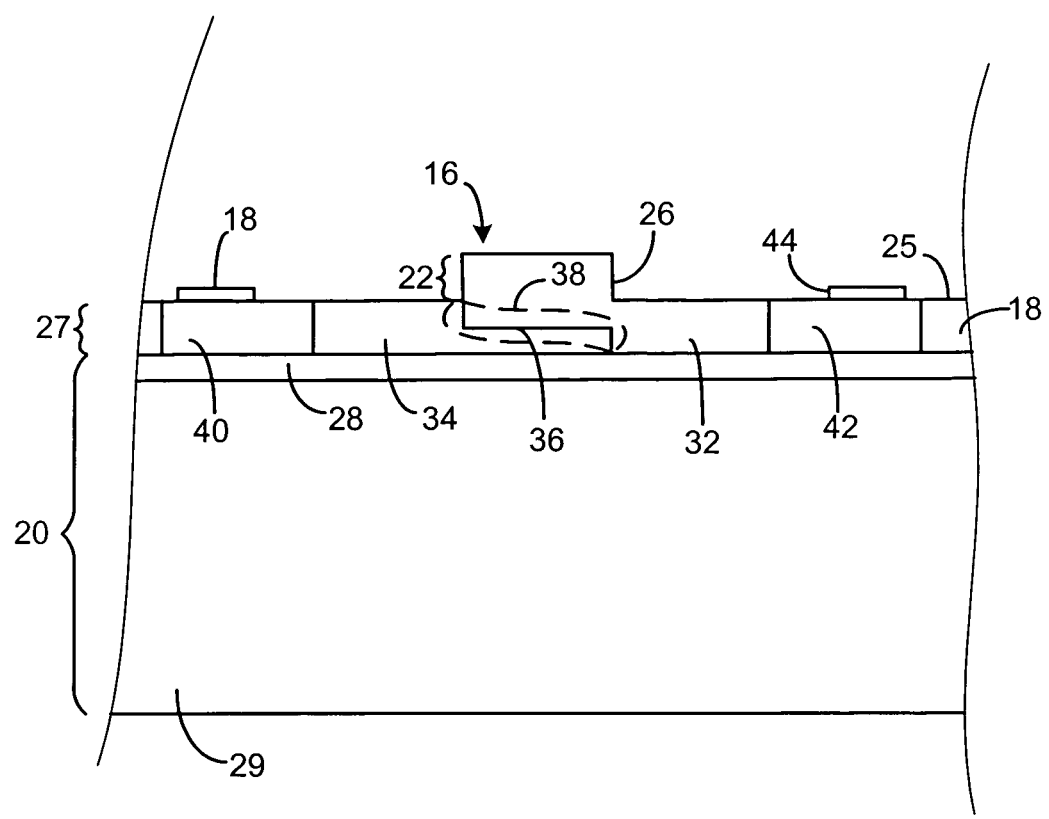

FIG. 1A through FIG. 1F illustrate an optical device having a waveguide that includes a modulator. FIG. 1A is a perspective view of the device. FIG. 1B is a topview of the portion of the optical device shown in FIG. 1A that includes an optical modulator. FIG. 1C is a cross-section of the device shown in FIG. 1A taken along the line labeled C. FIG. 1D is a cross-section of the optical device shown in FIG. 1A taken along the line labeled D. FIG. 1E is a cross-section of the optical device shown in FIG. 1A taken along the line labeled E. FIG. 1F is a cross-section of the optical device shown in FIG. 1A taken along the line labeled F.

The device is within the class of optical devices known as planar optical devices. These devices typically include one or more waveguides immobilized relative to a substrate or a base. The direction of propagation of light signals along the waveguides is generally parallel to a plane of the device. Examples of the plane of the device include the top side of the base, the bottom side of the base, the top side of the substrate, and/or the bottom side of the substrate.

The illustrated device includes lateral sides 10 (or edges) extending from a top side 12 to a bottom side 14. The propagation direction of light signals along the length of the waveguides on a planar optical device generally extends through the lateral sides 10 of the device. The top side 12 and the bottom side 14 of the device are non-lateral sides.

The device includes one or more waveguides 16 that carry light signals to and/or from optical components 17. Examples of optical components 17 that can be included on the device include, but are not limited to, one or more components selected from a group consisting of facets through which light signals can enter and/or exit a waveguide, entry/exit ports through which light signals can enter and/or exit a waveguide from above or below the device, multiplexers for combining multiple light signals onto a single waveguide, demultiplexers for separating multiple light signals such that different light signals are received on different waveguides, optical couplers, optical switches, lasers that act a source of a light signal, amplifiers for amplifying the intensity of a light signal, attenuators for attenuating the intensity of a light signal, modulators for modulating a signal onto a light signal, modulators that convert an light signal to an electrical signal, and vias that provide an optical pathway for a light signal traveling through the device from the bottom side 14 of the device to the top side 12 of the device. Additionally, the device can optionally, include electrical components. For instance, the device can include electrical connections for applying a potential or current to a waveguide and/or for controlling other components on the optical device.

A portion of the waveguide includes a first structure where a portion of the waveguide 16 is defined in a light-transmitting medium 18 positioned on a base 20. For instance, a portion of the waveguide 16 is partially defined by a ridge 22 extending upward from a slab region 24 of the light-transmitting medium 18 as shown in FIG. 1C. In some instances, the top of the slab region 24 is defined by the bottom of trenches 24 extending partially into the light-transmitting medium 18 or through the light-transmitting medium 18. Suitable light-transmitting media include, but are not limited to, silicon, polymers, silica, SiN, GaAs, InP and $LiNbO_3$. One or more cladding layers (not shown) are optionally positioned on the light-transmitting medium 18. The one or more cladding layers can serve as a cladding for the waveguide 16 and/or for the device. When the light-transmitting medium 18 is silicon, suitable cladding layers include, but are not limited to, silicon, polymers, silica, SiN, GaAs, InP and $LiNbO_3$.

Recesses 25 (FIG. 1B) extend into the slab regions 24 such that the ridge 22 is positioned between recesses 25. The recesses 25 can extend only part way into the light-transmitting medium 18. As is evident from FIG. 1D, the recesses 25 can be spaced apart from the ridge 22. As a result, a portion of the waveguide 16 includes a second structure where an upper portion of the waveguide 16 is partially defined by the ridge 22 extending upward from the slab region 24 and a lower portion of the waveguide is partially defined by recesses 25 extending into the slab regions 24 and spaced apart from the ridge 22.

As shown in FIG. 1E, the recesses 25 can approach the ridge 22 such that the sides of the ridge 22 and the sides of the recesses 25 combine into a single surface 26. As a result, a portion of a waveguide includes a third structure where the waveguide is partially defined by the surface 26. In the third structure, the bottom of the recesses 25 defines a slab region 27 where the ridge 22 extends upward from the slab region 27.

The portion of the base 20 adjacent to the light-transmitting medium 18 is configured to reflect light signals from the waveguide 16 back into the waveguide 16 in order to constrain light signals in the waveguide 16. For instance, the portion of the base 20 adjacent to the light-transmitting medium 18 can be an optical insulator 28 with a lower index of refraction than the light-transmitting medium 18. The drop in the index of refraction can cause reflection of a light signal from the light-transmitting medium 18 back into the light-transmitting medium 18. The base 20 can include the optical insulator 28 positioned on a substrate 29. As will become evident below, the substrate 29 can be configured to transmit light signals. For instance, the substrate 29 can be constructed of a light-transmitting medium 18 that is different from the light-transmitting medium 18 or the same as the light-transmitting medium 18. In one example, the device is constructed on a silicon-on-insulator wafer. A silicon-on-insulator wafer includes a silicon layer that serves as the light-transmitting medium 18. The silicon-on-insulator wafer also includes a layer of silica positioned on a silicon substrate. The layer of silica can serving as the optical insulator 28 and the silicon substrate can serve as the substrate 29.

The optical device includes a modulator 30. The location of the modulator 30 on the optical device is illustrated by the line labeled K in FIG. 1B. In order to simplify FIG. 1B, the details of the modulator construction are not shown in FIG. 1B. However, the modulator construction is evident from other illustrations such as FIG. 1F. FIG. 1F is a cross-section of the portion of the device that includes the modulator. The light-transmitting medium 18 includes a first doped region 32 that is at least partially positioned in the ridge 22. The light-transmitting medium 18 also includes a second doped region 34 that is at least partially positioned in the slab region 27. The first doped region 32 is positioned between the second doped region 34 and the top of the ridge 22 such that no portion of the second doped region 34 is positioned between the first doped region 32 and the top of the ridge 22. At least a portion of an interface 36 between the first doped region 32 and the second doped region 34 is horizontal and is located in the slab region 27.

When the first doped region 32 includes an n-type dopant, the second doped region 34 includes a p-type dopant and when the first doped region 32 includes a p-type dopant, the second doped region 34 includes an n-type dopant. The first doped region 32 and the second doped region 34 are positioned sufficiently close to one another that a depletion region 38 forms between the n-type region and the p-type region when a bias is not applied to the phase modulator. For instance, FIG. 1F illustrates the n-type region in contact with the p-type region. Contact between the n-type region and the p-type region may not be necessary although it can increase the efficiency of the modulator.

The depletion region results from a migration of carriers between the n-type region and the p-type region until a potential forms that prevents additional migration. This migration results in a lack of carriers in the depletion region. For instance, the depletion region has a carrier concentration of less than about $1\times10^{15}/cm^3$. The n-type region and a p-type region are positioned so the depletion region is positioned in the light signal-carrying region of the waveguide. A suitable concentration of carriers in the p-type region includes values greater than $1\times10^{15}/cm^3$, $1\times10^{16}/cm^3$, $3.5\times10^{16}/cm^3$, or $5.0\times10^{17}/cm^3$. A suitable value for the concentration of carriers in the n-type region includes values greater than $1\times10^{15}/cm^3$, $2\times10^{16}$, $5\times10^{16}$, and $1\times10^{18}$ $cm^{-3}$.

The light-transmitting medium 18 includes a second conducting doped region 40 located in the slab region 27 and contacting the second doped region 34. The second conducting doped region 40 can contact the second doped region 34 and can include the same type of dopant as the second doped region 34. The second conducting doped region 40 can have a higher dopant concentration than the second doped region 34. For instance, the dopant concentration in the second conducting doped region 40 can be more than 10 times the dopant concentration in the second doped region 34 or more than 1000 times the dopant concentration in the second doped region 34. The elevated dopant concentration increases electrical conductivity and reduces the contact resistance of the modulator and accordingly provides an increased modulation speed. Suitable concentrations for the dopant in the second conducting doped region 40 include, but are not limited to, concentrations greater than $1\times10^{18}/cm^3$, $1\times10^{19}/cm^3$, $5\times10^{19}/cm^3$, $1\times10^{20}/cm^3$. Increased levels of dopant concentration can be a source of optical loss. As a result, the second conducting doped region 40 is positioned remote from the light signal-carrying region of the waveguide in order to reduce optical loss resulting from the increased dopant concentration of the second conducting doped region 40. For instance, the second conducting doped region 40 is included in the slab region 27 and is spaced apart from the ridge 22. This location can reduce interaction between a light signal being carried in the waveguide and the second conducting doped region 40.

The light-transmitting medium 18 includes a first conducting doped region 42 located in the slab region 27 and contacting the first doped region 32. The first conducting doped region 42 can contact the first doped region 32 and can include the same type of dopant as the first doped region 32. The first conducting doped region 42 can have a higher dopant concentration than the first doped region 32. For instance, the dopant concentration in the first conducting doped region 42 can be more than 10 times the dopant concentration in the first doped region 32 or more than 1000 times the dopant concentration in the first doped region 32. The elevated dopant concentration increases electrical conductivity and reduces the contact resistance of the modulator and accordingly provides an increased modulation speed. Suitable concentrations for the dopant in the first conducting doped region 42 include, but are not limited to, concentrations greater than $1\times10^{18}/cm^3$, $1\times10^{19}/cm^3$, $5\times10^{19}/cm^3$, $1\times10^{20}/cm^3$. Increased levels of dopant concentration can be a source of optical loss. As a result, the first conducting doped region 42 is positioned remote from the light signal-carrying region of the waveguide in order to reduce optical loss resulting from the increased dopant concentration of the first conducting doped region 42. For instance, the first conducting doped region 42 is included in the slab region 27 and is spaced apart from the ridge 22. This location can reduce interaction between a light signal being carried in the waveguide and the first conducting doped region 42.

Electrical contacts 44 can be positioned on a location of the slab region 27 that is spaced apart from the ridge 22. For instance, FIG. 1F illustrates an electrical contact 44 in contact with the first conducting doped region 42 and spaced apart from the ridge 22. Another electrical contact 44 is in contact with the second conducting doped region 40 and is spaced apart from the ridge 22. Suitable electrical contacts 44 include, but are not limited to, metals such as Al, Ti, and Au.

The electrical contacts 44 are connected to electronics 46 (FIG. 1A) that can apply electrical energy to the electrical contacts 44. The first conducting doped region 42 provides an electrical pathway along which the electrical energy can travel between one of the electrical contacts 44 and the first doped region 32. Additionally, the second conducting doped region 40 provides an electrical pathway along which the electrical energy can travel between one of the electrical contacts 44 and the second doped region 34. Each of these electrical pathways is through the slab portion of the light-transmitting medium 18.

The electronics can apply an electrical bias across the electrical contacts 44. The bias can be a reverse bias. Changing the level of bias changes the size and/or shape of the depletion region. For instance, increasing the reverse bias can increase the size of the depletion region. The first doped region 32 and the second doped region 34 are positioned so the depletion region is formed in the waveguide. As a result, changing the size of the depletion region changes the speed at which the light signal travels through the waveguide. Accordingly, the speed of the light signal through the waveguide can be tuned by tuning the bias level applied to the modulator. Tuning the speed at which the light signal travels through the waveguide allows the modulator to be employed as a phase modulator.

Figure 3A:
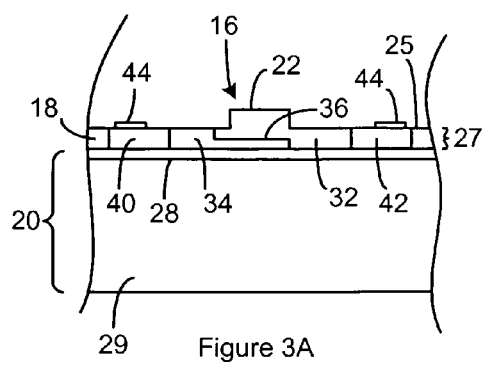
FIG. 3A through FIG. 3C illustrate alternative arrangements for the interface between the doped regions of FIG. 1A through FIG. 1F.
Figure 2A:
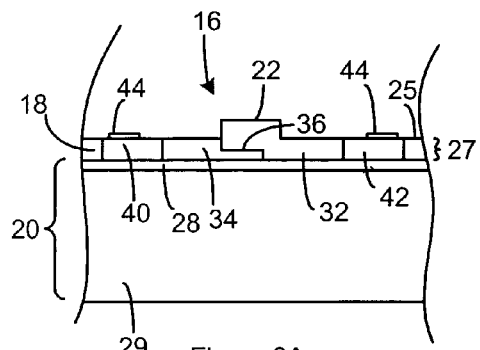
FIG. 2A and FIG. 2B illustrate alternative arrangements for the interface between the doped regions of FIG. 1A through FIG. 1F.
Figure 3B:
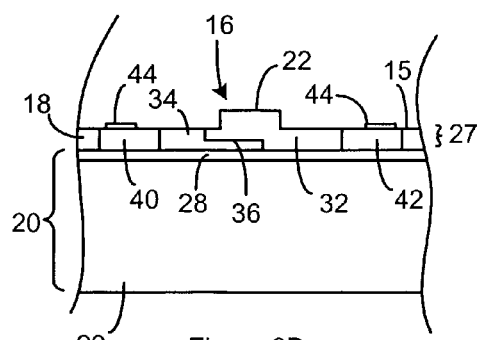
Figure 2B:
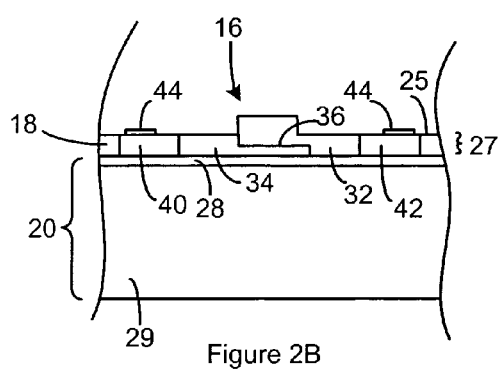
Figure 3C:
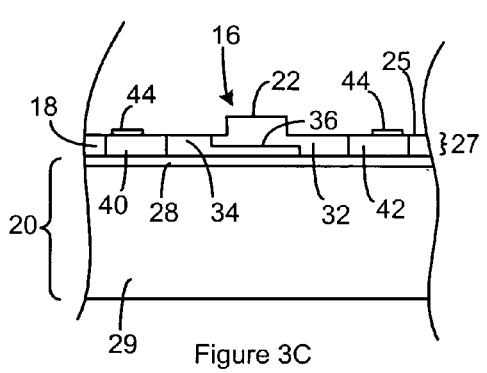
Figure 4A:
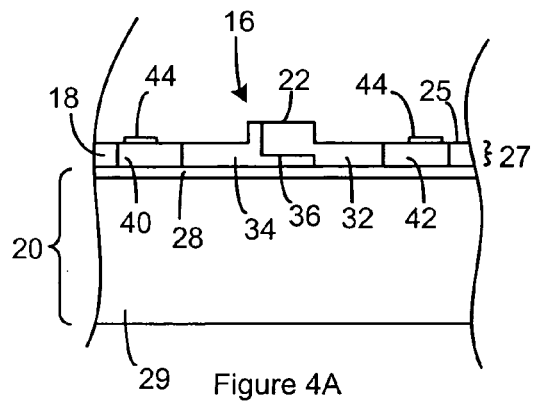
FIG. 4A through FIG. 4C illustrate alternative arrangements for the interface between the doped regions of FIG. 1A through FIG. 1F.
Figure 4B:
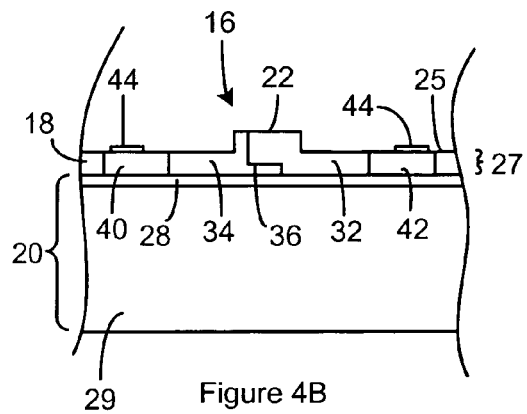
Figure 4C:
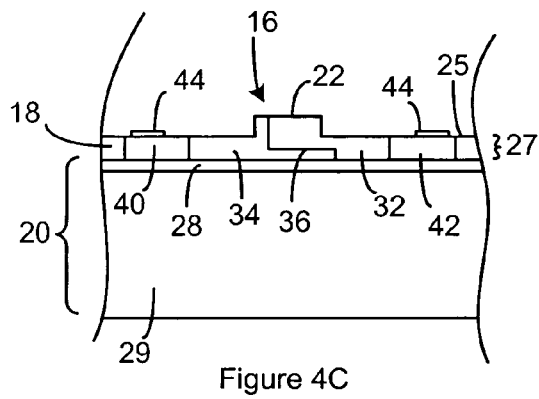

The interface 36 between the first doped region 32 and the second doped region 34 illustrated in FIG. 1F includes two different vertical portions. Each of the vertical portion is aligned with a lateral side of the ridge 22. However, in some embodiments, one or both of the vertical portions is not aligned with either of the later sides of the ridge 22. For instance, the lower vertical portion of the interface 36 can be moved under the ridge 22 as illustrated in FIG. 2A or can be moved out from under the ridge 22 as shown in FIG. 2B. Additionally or alternately, the upper vertical portion of the interface 36 can be out from under the ridge 22. For instance, FIG. 3A illustrates the modulator of FIG. 1F with the upper vertical portion of the interface 36 moved out from under the ridge 22. Further, FIG. 3B illustrates the modulator of FIG. 2A with the upper vertical portion of the interface 36 moved out from under the ridge 22 and FIG. 3C illustrates the modulator of FIG. 2B with the upper vertical portion of the interface 36 moved out from under the ridge 22. Additionally or alternately, the upper vertical portion of the interface 36 can be in and under the ridge 22. For instance, FIG. 4A illustrates the modulator of FIG. 1F with the upper vertical portion of the interface 36 in and under the ridge 22. Further, FIG. 4B illustrates the modulator of FIG. 2A with the upper vertical portion of the interface 36 in and under the ridge 22 and FIG. 4C illustrates the modulator of FIG. 2B with the upper vertical portion of the interface 36 in and under the ridge 22. The ability to move the vertical portions of the interface 36 relative to the ridge 22 can be used to optimize the shape of the resulting depletion region so as to optimize overlap with the optical mode.

In each of the embodiments illustrated above, the entire interface between the first doped region 32 and the second doped regions 34 is located in the slab region 27 of the light-transmitting medium 18. For instance, in FIG. 1A through FIG. 5, the second doped region 34 is not located in the ridge 22. When the entire interface is located below the ridge 22, the presence of the depletion region in the ridge 22 may decrease as the height of the ridge 22 increases. As a result, in some instances, it may be desirable to move at least a portion of the interface into the ridge 22.

Figure 5:
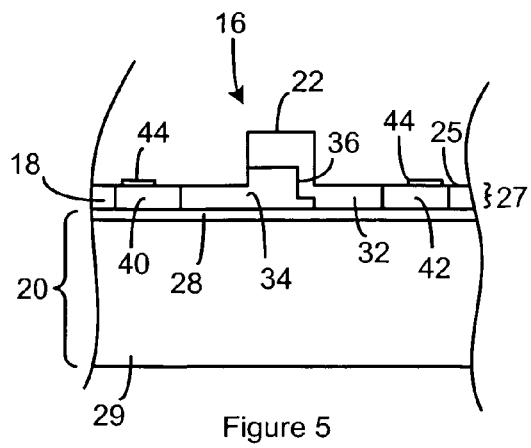
FIG. 5 illustrates an embodiment of the modulator where a portion of the interface is located in the ridge.

FIG. 5 illustrates an embodiment of the modulator where a portion of the interface is located in the ridge 22. In particular, a horizontal portion of the interface is located in the ridge 22. The first doped region 32 is shaped such that the first doped region 32 extends from the slab region 27 into the ridge 22 without the second doped region 34 being positioned between the first doped region 32 and the top of the ridge 22. For instance, the first doped region 32 extends from the first conducting doped region 42 into the ridge 22. In particular, the first doped region 32 extends from the first conducting doped region 42 to the top of the ridge 22. Accordingly, the first doped region 32 provides an electrical pathway between one of the electrical conductors and the top of the ridge 22.

Figure 6A:
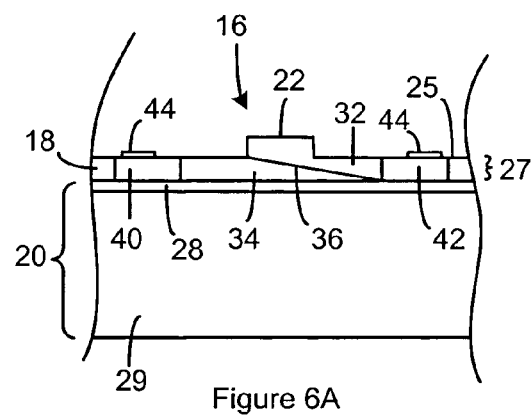
FIG. 6A and FIG. 6B each illustrates an embodiment of the modulator where a portion of the interface passes diagonally through a light-signal carrying region of the waveguide.
Figure 6B:
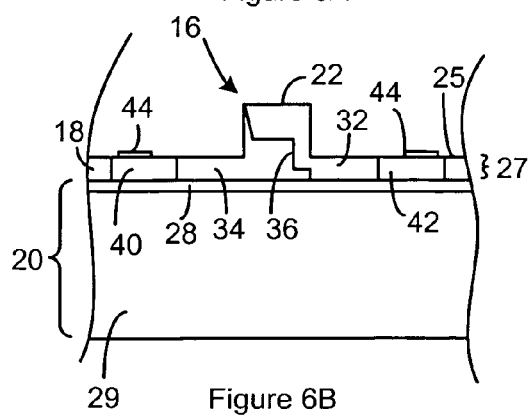

The interface need not be limited to vertical and horizontal portions. For instance, the first doped region 32 and the second doped region 34 can be formed such that all or a portion of the interface passes diagonally through the light-signal carrying region of the waveguide as is illustrated in FIG. 6A and FIG. 6B. An interface such as the interface illustrated in FIG. 6A and FIG. 6B can be achieved using angled implantation techniques to place the dopant in the light-transmitting medium 18.

Figure 7:
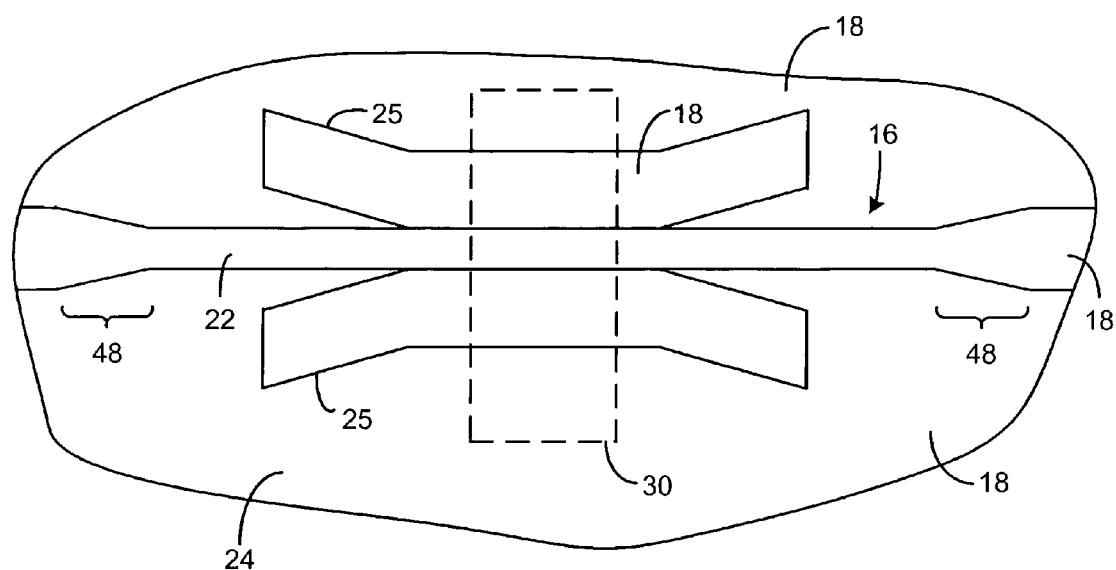
FIG. 7 is a topview of the optical device of FIG. 1B where the waveguide includes horizontal tapers and excludes vertical tapers.

The width of the waveguide can include horizontal tapers 48. For instance, FIG. 7 is a topview of an optical device where the waveguide includes tapers 48. The tapers 48 can be a horizontal taper and need not include a vertical taper although a vertical taper is optional. One of the tapers 48 is positioned before the modulator and can taper the waveguide to the width that is desired for the electro-absorption medium in the modulator. Another taper 48 is positioned after the modulator and can return the waveguide to the desired dimensions.

The horizontal tapers 48 occur in the light-transmitting medium 18. The horizontal tapers 48 can each be between a portion of the waveguide having the first structure and an expanded portion of the waveguide. The optical device preferably excludes additional components between the tapers 48 and modulator although other components may be present.

The expanded portion of the waveguide can be either multi-mode or single mode. Additionally, the portions of the waveguide having the first structure can be single mode or multi-mode. The portions of the waveguide having the third structure can be multi-mode or single mode. However, even when the portions of the waveguide having the first structure are single mode, the portions of the waveguide having the third structure can become vertically multimode as a result of the ridge 22 having an increased height relative to the height of the ridge 22 in the portions of the waveguide having the first structure. In general, the portion of the waveguide having the fourth structure is single mode when the portions of the waveguide having the third structure are single mode and the portion of the waveguide having the fourth structure is multi-mode when the portions of the waveguide having the third structure are multi-mode.

In view of the above, the portions of the waveguide having the second structure can be a transition between a portion of the waveguide that is single mode and a portion of the waveguide that is at least vertically multi-mode. In these instances, the distance between the recess 25 and the ridge 22 can taper so as to reduce excitation of higher order modes during this transition. In instances, where the portions of the waveguide having the second structure do not provide a transition between a portion of the waveguide that is single mode and a portion of the waveguide that multi-mode, the distance between the recess 25 and the ridge 22 can also taper so as to reduce excitation of higher order modes.

As noted above, the modulator is suitable for use with waveguide dimensions that are suitable for use in communications applications. Accordingly, a suitable height for the waveguide (distance between top of ridge 22 and the top of the base 20) for the potion of the waveguide 16 having the first structure (FIG. 1C) includes, but is not limited to, heights greater than 0.1 µm, 0.15 µm, and 0.2 µm. A suitable height for the ridge 22 (distance between top of ridge 22 and the top of the slab region 24) for the potion of the waveguide 16 that includes the first structure (FIG. 1C) includes, but is not limited to, heights greater than 0.05 µm, 0.1 µm, and 0.15 µm. A suitable width of the ridge 22 for the portion of the waveguide 16 having the first structure (FIG. 1C) includes, but is not limited to, widths greater than 0.25 µm, 1.0 µm, and 2.0 µm. A suitable height for the ridge 22 (distance between top of ridge 22 and the top of the slab region 27) for the potion of the waveguide 16 that includes the modulator (FIG. 1F) includes, but is not limited to, heights greater than 0.05 µm, 0.1 µm, and 0.15 µm.

The portions of the waveguide having the second structures, the third structures and the modulator can each exclude a vertical taper. As a result, the height of the waveguide (distance between top of ridge 22 and the base 20) for each of these portions of the waveguide can be about the same. In some instance, the height of the portions of the waveguide (distance between top of ridge 22 and the base 20) having the first structure is the same as the height of the second structures, the third structures and the fourth structure.

The recesses 25 are optional. However, in embodiments where the recesses 25 are present, a suitable depth for the recesses 25 to extend into the slab region 24 of the light-transmitting medium 18 includes but is not limited to, depths greater than 0.1, 0.15, and 0.2 and/or less than 0.3, 0.35, and 0.4.

Figure 8:
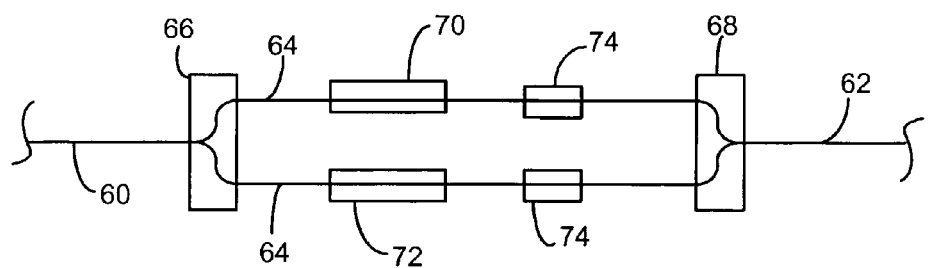
FIG. 8 illustrates an optical device having the modulator incorporated into a mach zehnder interferometer.

The above modulator can be incorporated into a mach zehnder interferometer as schematically illustrated in FIG. 8. The mach zehnder interferometer includes an input waveguide 60, an output waveguide 62, and branch waveguide 64. A first splitter 66 and/or combiner divides a light signal guided on the input waveguide into branch signal that are each on one of the branch waveguides. A second splitter and/or combiner 68 combines the branch signals into an output signal on the output waveguide.

A first modulator 70 is configured to modulate the branch signal on one of the branch waveguides and a second modulator 72 is configured to modulate the branch signal on the other branch waveguide. The first modulator and the second modulator can be configured as disclosed above and can each be operated as a phase modulator. By controlling the phase differential between the light signals on the branch waveguides, the intensity of the output light signal can be modulated. As a result, operating the modulators as a phase modulator can result in intensity modulation of the light signals.

One or more of the branch waveguides can optionally include other components such as variable optical attenuators 74 for balancing out the intensity on the different branch waveguides. Although modulators are shown positioned on each of the branch waveguides, only one of the branch waveguides need include a modulator in order for intensity modulation to be achieved.

The optical device can be constructed using fabrication technologies that are employed in the fabrication of integrated circuits, optoelectronic circuits, and/or optical devices. FIG. 9A through FIG. 14 illustrate methods for forming optical devices having a modulator constructed according to FIG. 1A through FIG. 6B. The method is illustrated using a silicon-on-insulator wafer or chip as the starting precursor for the optical device. However, the method can be adapted to platforms other than the silicon-on-insulator platform.

A first mask 80 can be formed on the device precursor so as to provide the device precursor of FIG. 9A and FIG. 9B. FIG. 9A is a topview of the device precursor. FIG. 9B is a cross-section of the device precursor shown in FIG. 9A taken along the line labeled B. The first mask 80 is formed such that the regions where the ridge of the waveguide is to be formed is protected while the remainder of the illustrated portion of the device precursor remains exposed. A suitable first mask 80 includes a hard mask such as a silica mask.

A first etch is performed on the device precursor of FIG. 9A and FIG. 9B to provide the device precursor of FIG. 10A and FIG. 10B. FIG. 10A is a topview of the device precursor. FIG. 10B is a cross-section of the device precursor shown in FIG. 10A taken along the line labeled B. The first etch is performed so as to form the ridge 22 of the waveguide to the desired height above the slab regions 24.

Figure 11A:
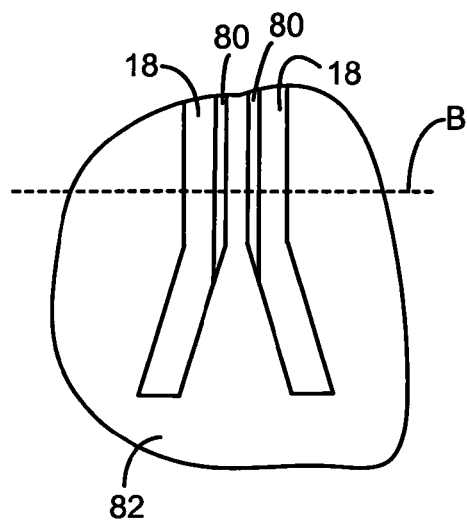
Figure 11B:
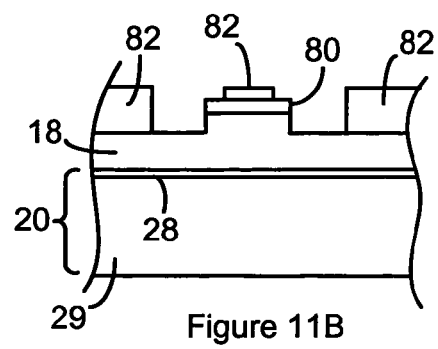

A second mask 82 is formed on the device precursor of FIG. 10A and FIG. 10C as shown by the device precursor of FIG. 11A and FIG. 11B. FIG. 11A is a topview of the device precursor. FIG. 11B is a cross-section of the device precursor shown in FIG. 9A taken along the line labeled B. The second mask 82 is formed such that the locations on the device precursor where the recesses 25 are to be formed remain exposed while the remaining regions of the illustrated portion of the device precursor are protected. Portions of the second mask 82 are formed over the first mask 80. However, the first mask 80 is exposed adjacent to regions of the device precursor where the recesses 25 are to be formed.

Figure 12A:
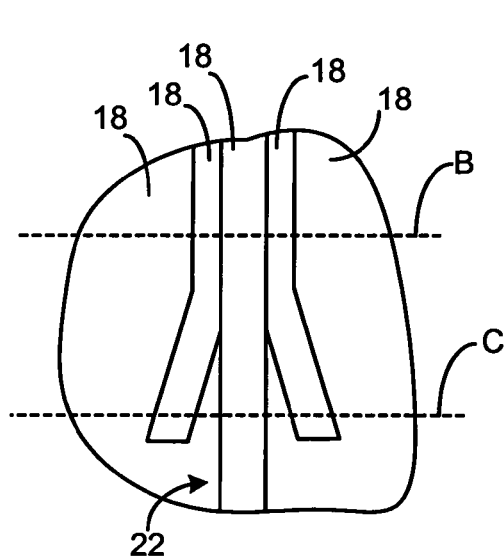
Figure 12B:
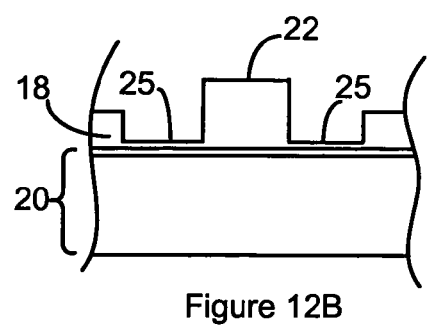
Figure 12C:
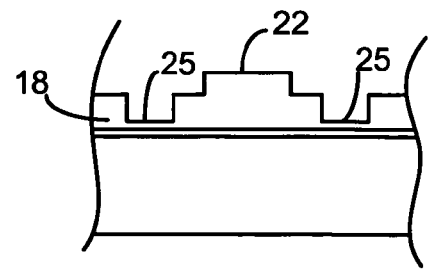

A second etch is then performed and the first mask 80 and the second mask 82 are removed so as to provide the device precursor of FIG. 12A through FIG. 12C. FIG. 12A is a topview of the device precursor. FIG. 12B is a cross-section of the device precursor shown in FIG. 12A taken along the line labeled B. FIG. 12C is a cross-section of the device precursor shown in FIG. 12A taken along the line labeled C. The second etch is performed to the depth of the recesses 25. Since the first mask 80 is exposed adjacent to regions of the device precursor where the recesses 25 are to be formed, the first mask defines a portion of the recesses 25 during the second etch. A suitable third mask 56 includes, but is not limited to, a photoresist. A suitable second etch includes, but is not limited to, a dry etch.

Figure 13A:
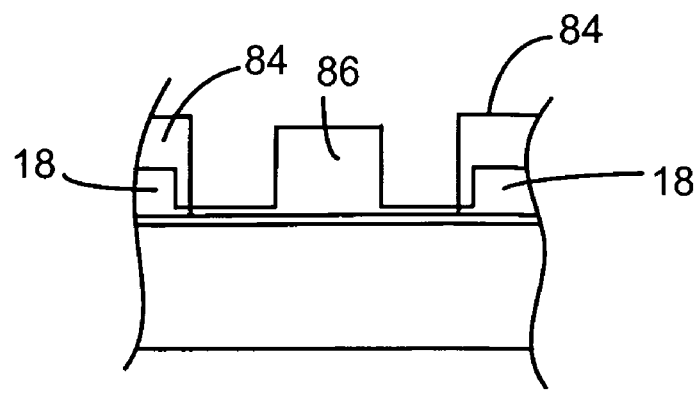

A first doping mask 84 is formed on the device precursor of FIG. 12A through FIG. 12C so as to form the device precursor of FIG. 13A. The first doping mask can be positioned such that the locations where both the first doped region and the second doped region 34 are to be formed remain exposed. A common doped region 86 is formed. The common doped region includes the regions of the device precursor where both the first doped region and the second doped region will be formed. The common doped region is formed using the dopant type that will be included in the second doped region. Suitable methods for forming the common doped region includes implantation. Suitable first doping masks 84 includes, but are not limited to, photoresists and hard masks such as oxide hard masks.

Figure 13B:
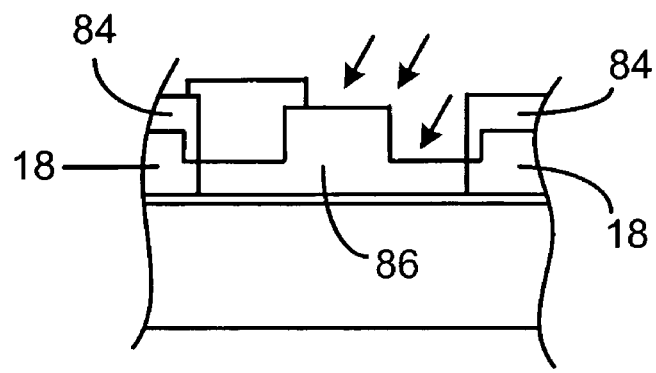
Figure 13C:
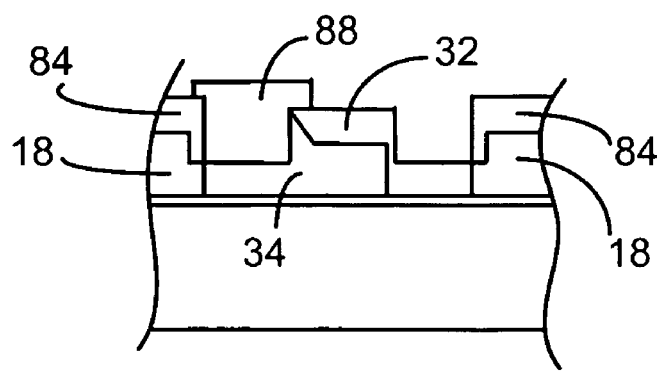

A second doping mask 88 is formed on the device precursor of FIG. 13A so as to form the device precursor of FIG. 13B. The second doping mask 88 is formed such that the regions of the device precursor where the first doped region 32 is to be formed remain exposed. A portion of the second doping mask 88 can be positioned over the first doping mask 84. The first doped region 32 can then be formed. When the common doped region is formed using an n-type dopant, the first doped region 32 is formed using a p-type dopant. When the common doped region is formed using a p-type dopant, the first doped region 32 is formed using an n-type dopant. As a result, the formation of the first doped region 32 results in the second doped region 34 being formed. Suitable methods for forming the common doped region includes implantation. The implantation can be an angled implantation as illustrated by the arrows in FIG. 13B. An angled implantation can form an interface between the first doped region 32 and the second doped region 34 that is at least partially diagonal as shown in FIG. 13C, 6A, or 6B. Suitable second doping masks 88 include, but are not limited to, hard masks such as oxide hard masks, and photoresists.

Figure 14:
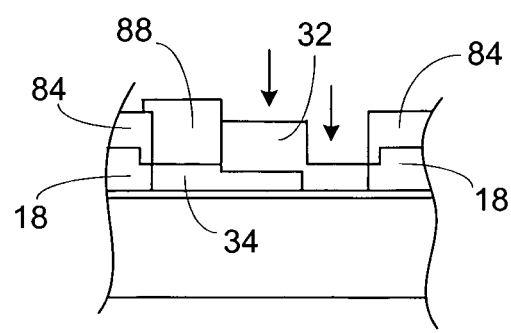

An alternative to angled implantation is the implantation illustrated by the arrows in FIG. 14. This implantation results in an interface between the first doped region 32 and the second doped region 34 such as shown in FIG. 14 and FIG. 1F. The locations and/or thicknesses of the masks, depths of the etches, and angle and/or energies of the dopant implantation can be changed to alter the shape of the interfaces. Changing the energy of dopant implantation can affect the depth to which the dopant is implanted. These variables can be altered to achieve the interfaces illustrated in FIG. 2A through FIG. 6B.

The first conducting doped region 42 and the second doped region 40 can be formed in the first doped region 32 and second doped region 34 of the device precursor of FIG. 13C or FIG. 14. For instance, a third doping mask can be formed over the first mask 80 and first doping mask 84 of FIG. 13C or FIG. 14 such that the location where the first conducting doped region 42 is to be formed remains exposed and the remainder of the device precursor is protected. This arrangement leaves a portion of the first doped region 32 shown in FIG. 13C or FIG. 14 to remain exposed. Implantation can then be used to form the first conducting doped region 42 in the exposed portion of the first doped region 32. The second doping mask 88 and the third doping mask can be removed and a fourth doping mask can be formed over the first mask 80 such that the location where the second conducting doped region 40 is to be formed remains exposed and the remainder of the device precursor is protected. This arrangement leaves a portion of the second doped region 34 shown in FIG. 13C or FIG. 14 to remain exposed. Implantation can then be used to form the second conducting doped region 40 in the exposed portion of the second doped region 34. Suitable second doping masks 88 include, but are not limited to, hard masks such as oxide hard masks, and photoresists.

The doping masks and the first mask 80 can be removed from the device precursor so as to form the optical device having modulators according to FIG. 1A through FIG. 6B. Additional features of the optical device such as electrical contacts can be constructed using fabrication technologies that are employed in the fabrication of integrated circuits, optoelectronic circuits, and/or optical devices.

Although the above method discloses implantation for forming the various doped regions, other methods of forming the doped regions can be employed. For instance, diffusion methods can be employed.

Suitable electronics for operating the above modulators can include a controller. A suitable controller includes, but is not limited to, a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions attributed to the electronics. A general-purpose processor may be a microprocessor, but in the alternative, the controller may include or consist of any conventional processor, microcontroller, or state machine. A controller may also be implemented as a combination of computing devices, e.g., a combination of a DSP and a microprocessor, a plurality of microprocessors, one or more microprocessors in conjunction with a DSP core, or any other such configuration.

The electronics can optionally include a memory in communication with the controller. The electronics can store data for executing the functions of the electronics in the memory. The memory can be any memory device or combination of memory devices suitable for read and/or write operations.

In some instances, the electronics include a computer-readable medium in communication with the controller. The computer-readable medium can have a set of instructions to be executed by the controller. The controller can read and execute instructions included on the computer-readable medium. The controller executes the instructions such that the electronics perform one or more of the described functions. The computer-readable medium cab be different from the memory or can be the same as the memory. Suitable computer-readable media include, but are not limited to, optical discs such as CDs, magnetic storage diskettes, Zip disks, magnetic tapes, RAMs, and ROMs. Some functions of the electronics may be executed using hardware as opposed to executing these functions in firmware and/or software.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An optical device, comprising:
a light-transmitting medium positioned on a base, the light-transmitting medium including a slab region and a ridge extending upward from the slab region, the ridge defining a portion of an optical waveguide on the device; and
a modulator positioned on the base, the modulator including a first doped region of the light-transmitting medium and a second doped region of the light-transmitting medium,
when the first doped region includes an n-type dopant the second doped region includes a p-type dopant and when the first doped region includes the p-type dopant the second doped region includes the n-type dopant,
at least a portion of the first doped region being positioned in the ridge and between the second doped region and a top of the ridge, and at least a portion of the second doped region being positioned in the slab region, and none of the second doped region being located between the first doped region and the top of the ridge, and
the light-transmitting medium including a first electrical pathway extending from a first location to the first doped region, the first location being on top of the light-transmitting medium and spaced apart from the ridge.

2. The device of claim 1, wherein the light-transmitting medium includes a second electrical pathway extending from a second location to the second doped region, the second location being on top of the light-transmitting medium and spaced apart from the ridge.

3. The device of claim 1, wherein the first doped region contacts the second doped region.

4. The device of claim 3, wherein the contact between the first doped region and the second doped region defines an interface and at least a portion of a length of the interface is located in the slab region.

5. The device of claim 4, wherein at least a portion of the interface is horizontal relative to the base.

6. The device of claim 1, wherein the light-transmitting medium includes a first conducting doped region that contacts the first doped region and also the top of the light-transmitting medium, the first conducting doped region serving as the first electrical pathway.

7. The device of claim 6, wherein no portion of the first conducting doped region is located under the ridge.

8. The device of claim 7, wherein when the first doped region includes the n-type dopant, the first conducting doped region includes the n-type dopant and when the first doped region includes the p-type dopant, the first conducting doped region includes the p-type dopant.

9. The device of claim 8, wherein a concentration of the dopant in the first conducting doped region is higher than a concentration of the dopant in the first doped region.

10. The device of claim 8, wherein the light-transmitting medium includes a second conducting doped region that contacts the second doped region and also the top of the light-transmitting medium, the second conducting doped region conducting electrical current between the second doped region and the top of the light-transmitting medium.

11. The device of claim 10, wherein no portion of the second conducting doped region is located under the ridge.

12. The device of claim 11, wherein when the second doped region includes the n-type dopant, the second conducting doped region includes the n-type dopant and when the second doped region includes the p-type dopant, the second conducting doped region includes the p-type dopant.

13. The device of claim 12, wherein a concentration of the dopant in the second conducting doped region is higher than a concentration of the dopant in the second doped region.

14. The device of claim 1, wherein the first doped region contacts the second doped region so as to form an interface and at least a portion of the interface is located in the ridge.

15. The device of claim 14, wherein a portion of the first doped region is located in the slab region.

16. The device of claim 3, wherein the light-transmitting medium includes a first conducting doped region that contacts the first doped region and also the top of the light-transmitting medium, the first conducting doped region serving as the first electrical pathway.

17. The device of claim 16, wherein no portion of the first conducting doped region is located under the ridge.

18. The device of claim 17, wherein when the first doped region includes the n-type dopant, the first conducting doped region includes the n-type dopant and when the first doped region includes the p-type dopant, the first conducting doped region includes the p-type dopant.

19. The device of claim 18, wherein a concentration of the dopant in the first conducting doped region is higher than a concentration of the dopant in the first doped region.

20. The device of claim 14, wherein the light-transmitting medium includes a first conducting doped region that contacts the first doped region and also the top of the light-transmitting medium, the first conducting doped region serving as the first electrical pathway.

* * * * *